United States Patent
Schnöwitz et al.

(10) Patent No.: US 6,467,805 B1
(45) Date of Patent: Oct. 22, 2002

(54) DEVICE FOR INFLUENCING THE INFLOW OF GAS INTO THE GAS BAG OF AN AIR BAG MODULE

(75) Inventors: Jörn Schnöwitz, Aschaffenburg; Martin Kamm; Nick Eckert, both of Berlin; Sven Ortmann, Fredersdorf; Dieter Markfort, Berlin, all of (DE)

(73) Assignee: Takata-Petri AG, Aschaffenberg (DE)

( * ) Notice: Subject to any disclaimer, the term of this patent is extended or adjusted under 35 U.S.C. 154(b) by 0 days.

(21) Appl. No.: 09/194,093

(22) PCT Filed: Jun. 16, 1997

(86) PCT No.: PCT/DE97/01252

§ 371 (c)(1),
(2), (4) Date: Apr. 27, 2000

(87) PCT Pub. No.: WO97/49581

PCT Pub. Date: Dec. 31, 1997

(30) Foreign Application Priority Data

Jun. 21, 1996 (DE) .......................................... 196 26 463

(51) Int. Cl.⁷ .............................................. B60R 21/26
(52) U.S. Cl. ........................ 280/740; 280/736; 280/742
(58) Field of Search ................................. 280/736, 737, 280/739, 740, 741, 742

(56) References Cited

U.S. PATENT DOCUMENTS

| 3,528,681 A | * | 9/1970 | Ekstrom | 280/737 |
|---|---|---|---|---|
| 3,602,526 A | * | 8/1971 | Brawn | 280/740 |
| 4,068,862 A | | 1/1978 | Ishi et al. | 280/740 |
| 4,178,017 A | | 12/1979 | Ishi et al. | 280/740 |
| 4,944,527 A | * | 7/1990 | Bishop et al. | 280/741 |
| 5,149,130 A | | 9/1992 | Wooley et al. | 280/743 |
| 5,160,164 A | | 11/1992 | Fischer et al. | 280/743 |
| 5,306,042 A | | 4/1994 | Frank | 280/728 B |
| 5,340,147 A | * | 8/1994 | Fontecchio et al. | 280/740 |
| 5,524,925 A | | 6/1996 | Rose et al. | 280/739 |
| 5,556,124 A | | 9/1996 | Olson | 280/728.2 |
| 5,564,742 A | * | 10/1996 | Clark et al. | 280/740 |

FOREIGN PATENT DOCUMENTS

| DE | 2547724 | 5/1976 |
|---|---|---|
| DE | 4218659 | 12/1992 |
| DE | 4433014 | 3/1995 |
| DE | 19602471 | 7/1996 |
| DE | 29612777 | 1/1997 |
| EP | 0677433 | 10/1995 |
| EP | 0 879 739 A1 * | 11/1998 |
| GB | 1503373 | 8/1978 |
| GB | 2 320 470 A * | 6/1998 |
| JP | 9-86331 A * | 3/1997 |
| JP | 09086333 | 3/1997 |

* cited by examiner

Primary Examiner—Paul N. Dickson
Assistant Examiner—Ruth Ilan
(74) Attorney, Agent, or Firm—Foley & Lardner

(57) ABSTRACT

In an embodiment of the present invention, a device for influencing the flow of the gas into a gas bag of an airbag module with an inflating device and a gas bag, wherein at least one component part is provided between the inflating device and the gas bag. The component part is deformable under the pressure of the gas emerging from the inflating device and forms or releases at least one opening in the predetermined direction. The component part has a flap-like section which is defined at least in part by surrounding perforations in the component part, and between the component part and the flap-like section there are overlapping slits between which at least one retaining tab is formed which connects the component part to the flap-like section.

15 Claims, 9 Drawing Sheets

DEVICE FOR INFLUENCING THE INFLOW OF GAS INTO THE GAS BAG OF AN AIR BAG MODULE

FIELD OF THE INVENTION

The invention relates to a device for influencing the inflow of gas into a gas bag of an airbag module.

BACKGROUND OF THE INVENTION

Devices for influencing the flow direction of the gas emerging from a gas generator of an airbag module are known. It is thereby achieved that the gas bag is primarily inflated in a direction which is advantageous for protecting the vehicle occupant.

From U.S. Pat. No. 5,149,130 an airbag is known wherein thermal protection extends around the gas generator. This thermal protection has flaps, which, after detonation of the gas generator, open up and allow unrestricted flow of the gas into the airbag. The flaps are only connected to the thermal protection on one side.

Furthermore, from U.S. Pat. No. 4,178,017, guide plates are known which are mounted in front of the outlet openings of the gas generator. The guide plates are deformed by the gases emerging from the gas generator so that they release the outlet openings fully or in part.

A reproducible influence of the flow direction of the gases emerging from the gas generator is only possible with difficulty with these arrangements.

From U.S. Pat. No. 5,306,042 a device is known for controlling the unfolding of a passenger airbag. With this device a cover cap is provided over the folded gas bag and after detonation of the gas generator the cover is lifted away from the dashboard by the inflating gas bag and is swivelled about a predetermined angle. The cover cap is located between the gas bag and windscreen even after its lifting. This stops the gas bag from spreading out in the direction of the windscreen and the gas bag spreads out primarily in the direction of the vehicle occupant.

The drawback with this device is that the cover cap must have side guides in order to allow lifting and swivelling to the required extent. The cover cap is thereby significantly more complicated and expensive than conventional cover caps.

In order to influence the stream of gas emerging from the gas generator towards the gas bag, diffusers are also known. These are mounted between the gas generator and the gas bag. Thus from EP A 0 677 433 A1 a diffuser is known which has flow openings which are restricted by inclined guide plates. In this way the gas emerging upwards from the gas generator is deflected and first meets the side sections of the gas bag so that these are inflated first while the middle section inflation is delayed.

The drawback with such a diffuser is that the manufacturing costs are increased through the guide devices and that the structural height of the airbag module is increased through the protruding guide devices. This is however disadvantageous since, both in the steering wheel and in the remaining structural groups in which airbag modules are to be stored with the folded gas bag, there is little space available.

SUMMARY OF THE INVENTION

The object of the invention is to be able to influence the flow direction of the gas emerging from an inflation device and thus the inflow of the gas into the gas bag at lower expense and without the need for additional space in the area of the folded gas bag.

A device for influencing the flow of gas into a gas bag of an airbag module with an inflating device and a gas bag includes at least one component part between the inflating device and the gas bag. The component part is deformable under the pressure of the gas emerging from the inflating device and forms or releases at least one opening in the predetermined direction. The component part has a flap-like section which is defined at least in part by surrounding perforations in the component part, and between the flap-like section and the remainder of the component part there are overlapping slits between which at least one retaining tab is formed which connects the flap-like section to the remainder of the component part.

The retaining tab is provided opposite the hinge-like connection between the flap-like section and the remainder of the component part and is bent up under the action of the gas pressure. The swivel area of the flap-like section is defined by the retaining tab. The swivel area can be predetermined in size more particularly by the choice of length and shape of the retaining tab.

Diffusers can be used wherein during the manufacturing process no additional deformations are required for producing guide devices. The guide devices are first produced directly after activation of the inflation device by utilizing the pressure exerted by the gases. During manufacture of the diffusers, punched out areas are only to be provided to allow deformation of a corresponding component part.

An important advantage exists in that, owing to the production of the guide device only after activation of the inflation device, no additional stowage space is required for the airbag module.

The size and shape of the flap-like section is determined by the extension, shape and position of the perforations. It is expedient if the perforations are designed slit-like. The flap-like section can swivel on one or both sides in dependence on the desired flow direction of the gas.

An expedient embodiment of the present invention provides that the flap like section has on two opposite sides a continuous connection with the component part acting as a hinge and that at least one slit and retaining tab run in the flap like section parallel to these sides. With this embodiment the middle area of the flap like section is curved upwards under the influence of the pressurized gas. The retaining tab can preferably have an L, Z, U or T shape.

In order to influence the swivel area of the flap-like section in one embodiment, pressure compensating openings are provided in the flap-like section. Through the choice of size of these openings it is possible to influence the surface area load of the flap section through the pressurized gas and thus its swivel area.

In another embodiment, the component part with the flap section is preferably a constituent part of a gas collecting tube which encloses the inflation device. Compared to a conventional gas collecting tube it is only necessary to define the flap section through perforations or slit-like punched out areas in the gas collecting tube. Compared to a known gas collecting tube, no additional space is required.

In another embodiment, the component part with the flap section can however also be any other structural group between the inflation device and gas bag.

The flap-like section has a curved cross-sectional shape.

In another alternative embodiment, the component part has opposing side parts instead of a flap-like section, and at least one section can be moved away from another section under pressure of the gas.

In a further embodiment, at least one part of the deformable component part has a different stiffness from the other parts of the component part. If the two parts have the same stiffness the two parts are deformed and pressed away from each other more evenly. If however one part has a greater stiffness than the other part then one part is not or only significantly less deformed than the other part. This can be achieved for example by the provision of corrugations. The part with the greater stiffness which is not or little deformed serves as the guide device for the gas whilst the stiffness of the second part determines the size of the flow opening for the gas. The arrangement of at least one corrugation in at least one of the parts is also expedient because here a space is provided between the parts into which the gas can enter. The process of separating the parts and thus of releasing the flow opening is thereby assisted.

Different stiffness can also be achieved by choice of material and/or by different material thickness. The deformable component part preferably consists of metal. The component part can be deformed both plastically and elastically through the pressure of the gas flowing out of the inflation device.

BRIEF DESCRIPTION OF THE DRAWINGS

The invention will now be explained with reference to the embodiments shown in the drawings in which.

DETAILED DESCRIPTION OF THE PREFERRED EMBODIMENT

Figure 1:
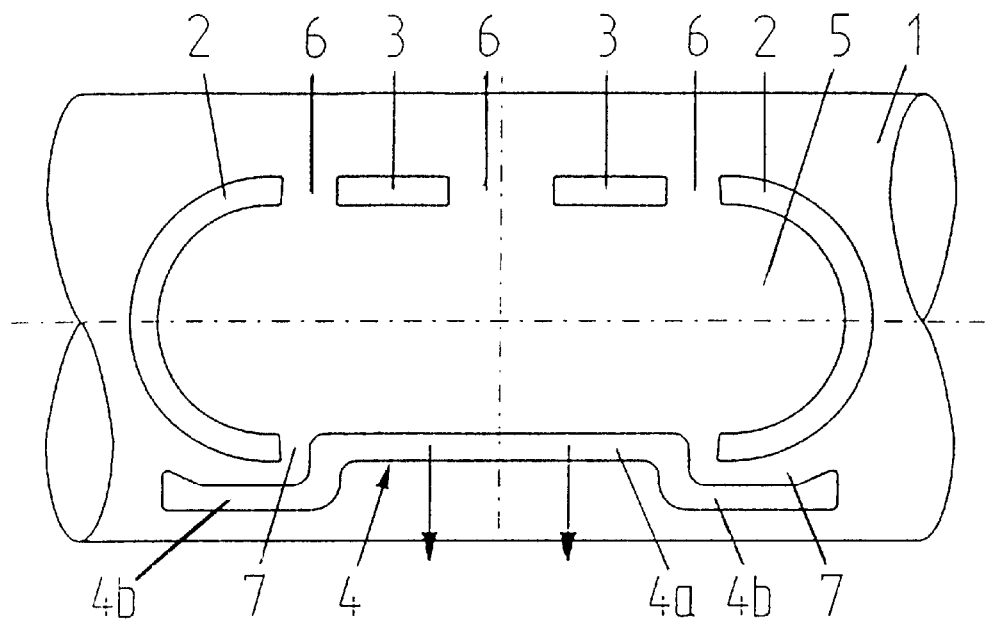
FIG. 1 shows a gas collecting tube with outflow flap opening on one side.
Figure 2:
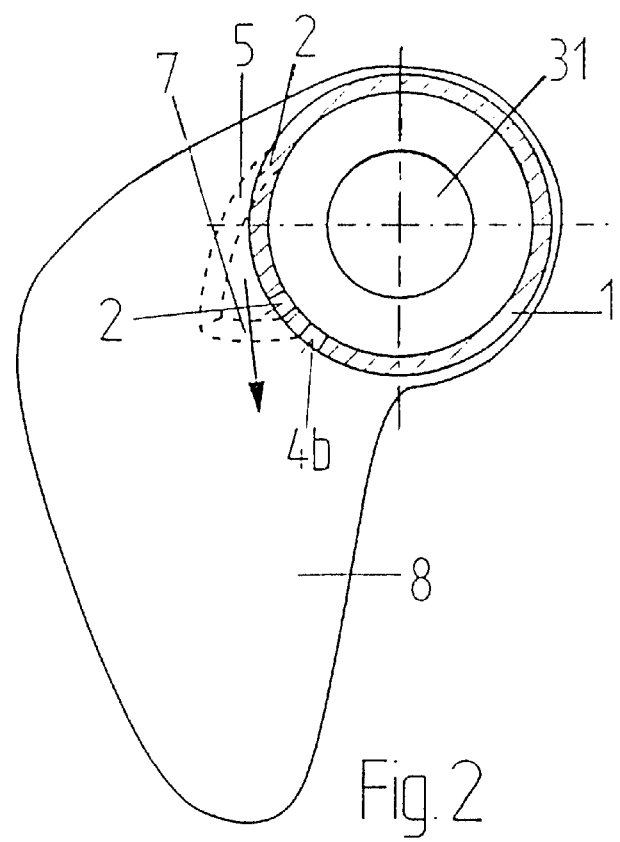
FIG. 2 is a cross-sectional view through the gas collecting tube according to FIG. 1.

In FIG. 1, a gas collecting tube 1 is shown in which a gas generator 31 (FIG. 2) is mounted. The gas collecting tube 1 is a hollow cylinder with a circular cross-section, as can be seen from FIG. 2. In FIG. 2 the gas collecting tube is shown on a smaller scale compared with FIG. 1, whereby the wall thickness of the tube is shown excessively thick. The gas collecting tube is provided with punched out areas 2, 3 and 4, whereby a flap-like section 5 is formed. The punched out areas are provided in an area of the gas collecting tube in which the folded gas bag adjoins the tube. The flap like section 5 is separated sideways from the gas collecting tube 1 by the punched out areas 2. The punched out areas 3 interrupt the connection of the flap like section with the gas collecting tube 1 in part whereby a connection is still provided through the webs 6. The punched out areas 2 and the webs 6 allow the flap like section 5 to be folded up around the webs 6 which act as a hinge.

The punched out area 4 has a center section 4a which extends between the two punched out areas 2 and is opposite the punched out areas 3. The punched out area 4 has furthermore side sections 4b which overlap in part the punched-out areas 2 so that L-shaped retaining tabs 7 are formed between the two. These retaining tabs produce a restriction for folding up the flap like section 5 under the effect of pressurized gas.

In the resting state, the gas collecting tube corresponds to a known gas collecting tube, except for the punched out areas. No additional space or expense for a separate diffuser is required. After detonation of the gas generator with the device, the flap-like section 5 is bent up under the action of the pressurized gas and releases one or more flow openings into the gas bag. According to the invention a diffuser is thus only built up at the moment when necessary. In the present embodiment the flap like section 5 serves to let the gas jet flow sideways out of the gas collecting tube 1 across its longitudinal axis and enter the gas bag 8.

Figure 3:
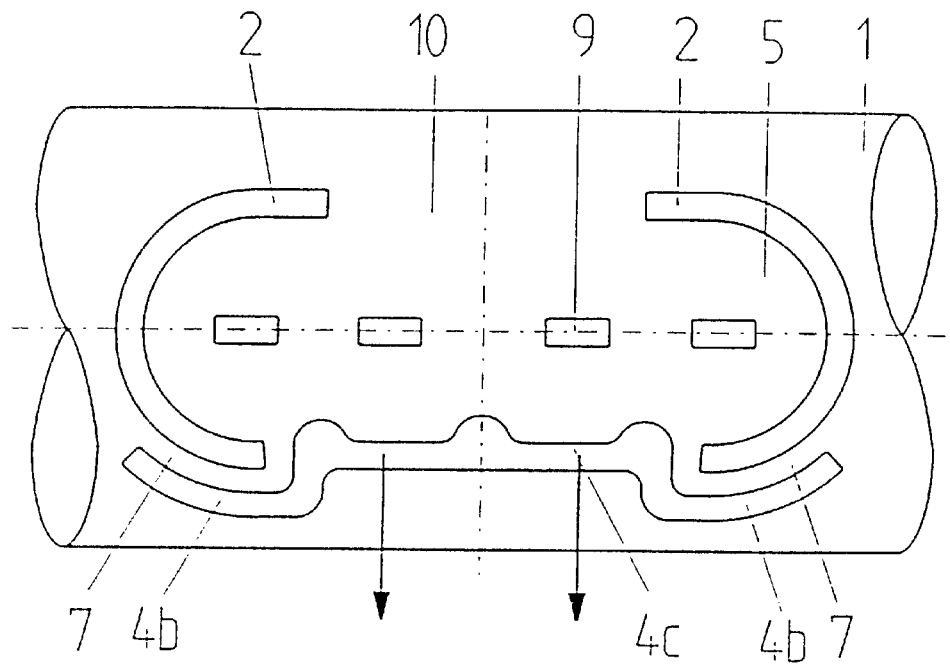
FIG. 3 shows an outflow flap with pressure compensating openings opening on one side.

In another embodiment shown in FIG. 3, pressure compensating openings 9 are provided in the flap like section 5 which slightly reduce its folding speed. Through the size of the pressure compensating openings it is possible to achieve different folding speeds.

With the embodiment of FIG. 3, the punched out area 4 furthermore has a middle section 4c which has an undulating edge adjoining the flap like section. As a result the flap like section also has in this area an undulating edge. The flow in the work position of the section 5 tears past this edge so that a turbulent stream is then formed. As with the embodiment of FIG. 1, L-shaped retaining tabs 7 are provided between the punched out areas 2 and 4b.

As opposed to the embodiment of FIG. 1, in the embodiment of FIG. 3 the punched out areas 2 are longer on the hinge side and a continuous section 10 is provided which acts like a hinge.

With the previous embodiments the punched out areas are arranged so that the gas flows down across the longitudinal axis of the gas collecting tube. In an alternative embodiment shown in FIG. 4, the flow takes place mainly in the direction of the longitudinal axis of the gas collecting tube in that the hinge like sections 10 lie across this axis. In this embodiment F-shaped punched out areas 11 are provided which are associated on the hinge side with a punched out area 3 and on the opposite side with a punched out area 12 so that z-shaped retaining webs 13 are provided.

Figure 4:
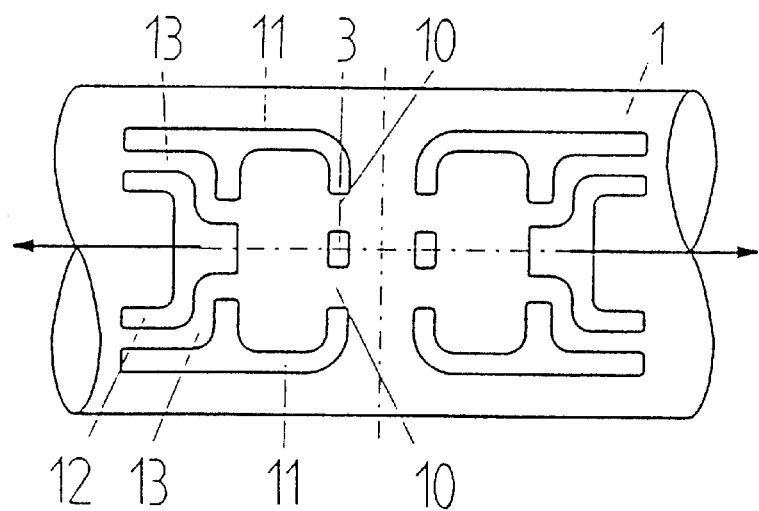
FIG. 4 shows an outflow flap lying across the longitudinal axis of a tubular gas generator.

With a mirror image arrangement of the punched out areas relative to a transverse axis as shown on the right hand side of FIG. 4, a preferred flow in the opposite direction is achieved.

Figure 5:
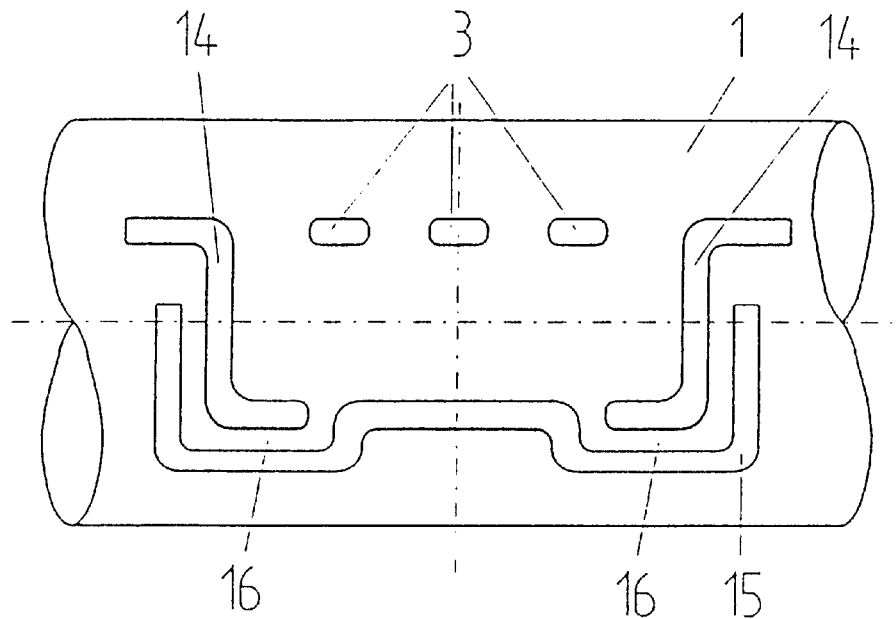
FIGS. 5 and 6 are variations of a flap opening on one side.

In another alternative embodiment shown in FIG. 5, two z-shaped punched out areas 14 are provided between punched out areas 3 which lie on the hinge side and punched out areas 15, so that U-shaped retaining tabs 16 are provided between punched out areas 15 and the punched out areas 14.

Figure 6:
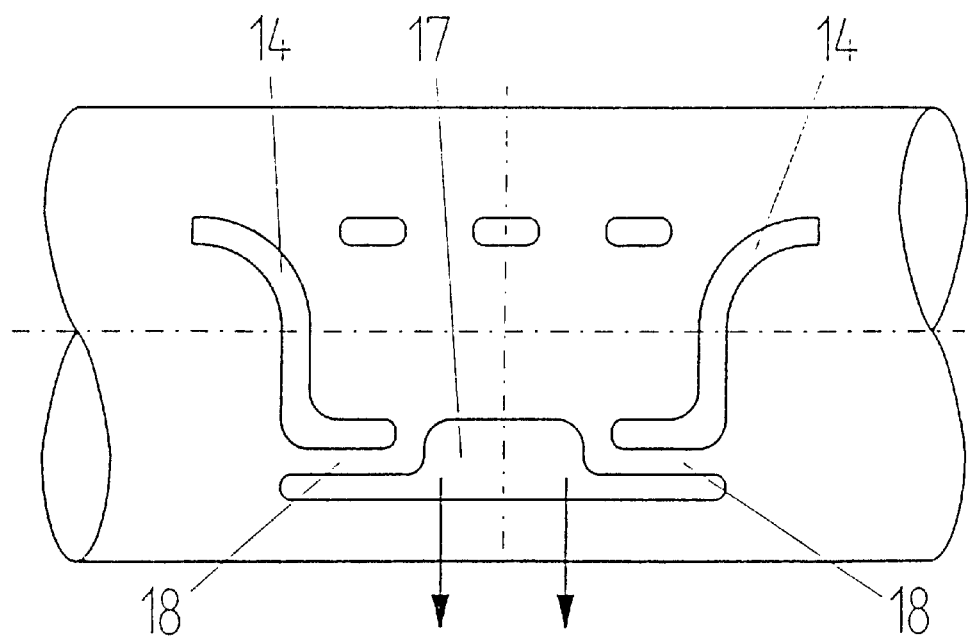

In another alternative embodiment shown in FIG. 6, which is similar to that of FIG. 5, in place of the punched out area 15, a punched out area 17 is provided such that between this and the z-shaped punched out areas 14 are formed L-shaped retaining webs 18.

Figure 7:
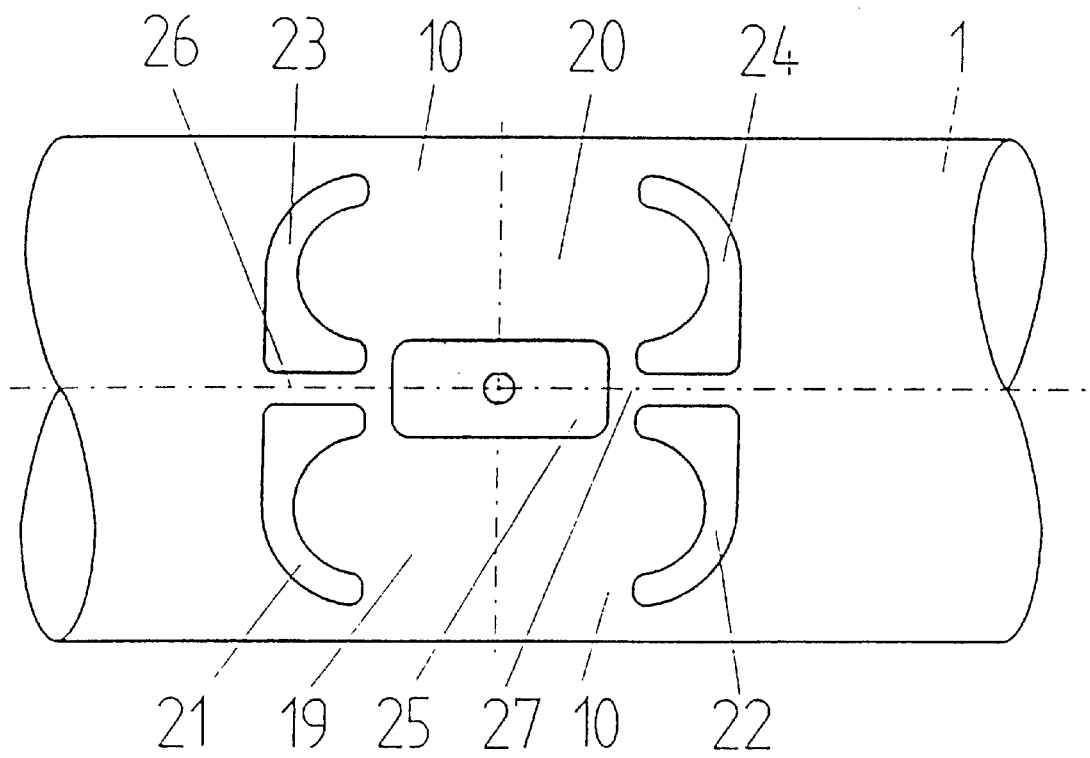
FIG. 7 shows a design with flap opening on both sides.
Figure 8:
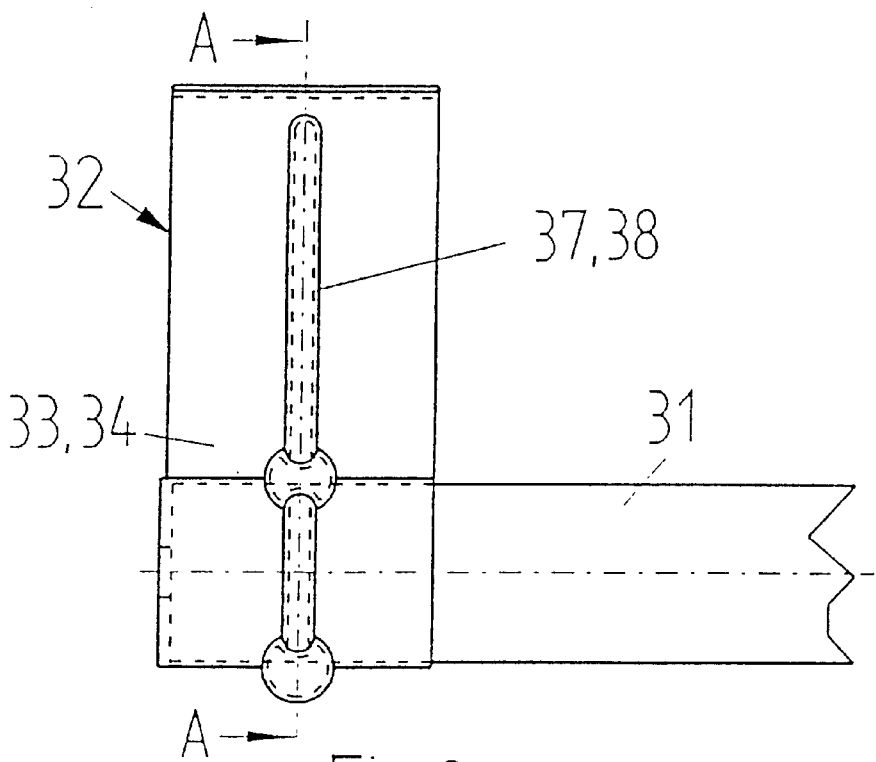
FIG. 8 is a side view of a flap diffuser.

Whereas with the previous embodiments the punched out areas are provided so that the flap like sections open on one side under the effect of pressure, in another alternative embodiment shown in FIG. 7, two symmetrical flap like sections 19, 20 are provided which extend between punched out areas 21, 22, 23 and 24. Furthermore a middle punched out area 25 is provided which extends between the flap-like sections 19 and 20. These are connected together by T-shaped retaining tabs 26 and 27 which extend between the punched out areas 21, 23 and 22, 24 as well as the middle punched out area 25.

With this embodiment, the flow takes place on one side though the middle punched out area 25, i.e. at right angles to the drawing plane. On the other side, the flap like sections are lifted in the middle under the action of the pressurized gas and the gas then also flows down sideways in the direction of the longitudinal axis of the gas collecting tube.

In the illustrated embodiments the punched out areas and thus the flap like section can be provided in one gas collecting tube. The component part in which the flap like section is provided can however also be any other component part between the inflation device and the gas bag.

Figure 9:
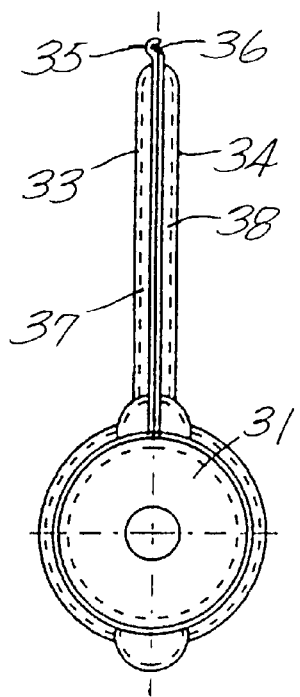
FIG. 9 is a front view of the diffuser according to FIG. 8.
Figure 10:
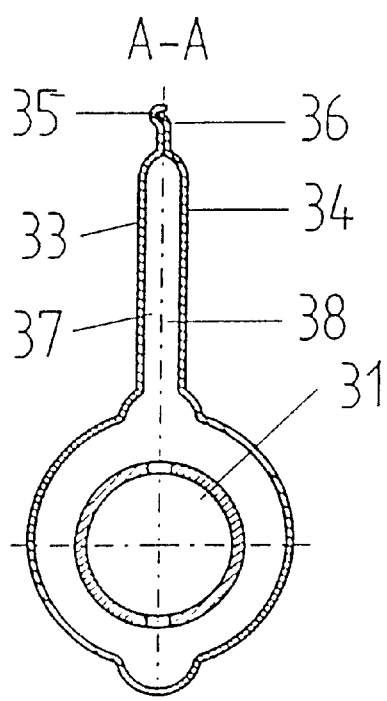
FIG. 10 is a cross-sectional view of the diffuser taken along line A—A of FIG. 8.
Figure 11:
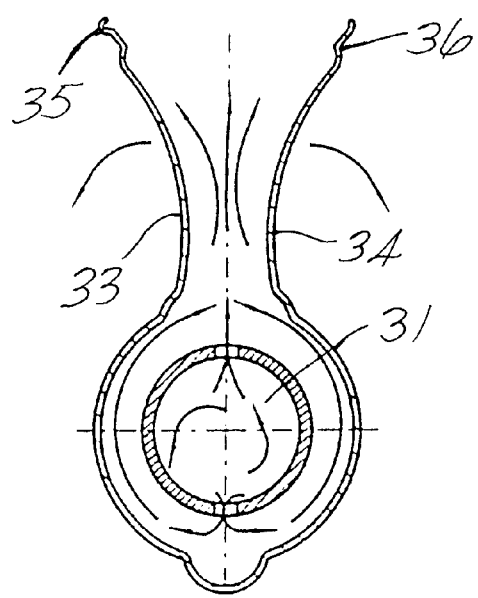
FIG. 11 is a cross-sectional view of the diffuser according to FIG. 8 in the opened position.

An alternative embodiment is shown in FIGS. 8 to 11 wherein in the area of a gas generator 31, a diffuser 32 is provided which encloses the gas generator 31 and has in the upper area opposing side parts 33, 34 which are connected together. Since the side parts lie directly on top of each other the space requirement is very small. These side parts have at the upper connecting areas lips 35, 36 and also corrugations 37, 38. Between these corrugations is a channel for the gas to flow out of the gas generator. The FIGS. 9 and 10 show the diffuser prior to the outlet of the gas from the gas generator. Under the action of the pressurized gas, the side parts 33, 34 are pressed away from each other so that an opening is released at the top as shown in FIG. 11. The lips 35, 36 prevent damage to the gas bag as the side parts open.

Figure 12:
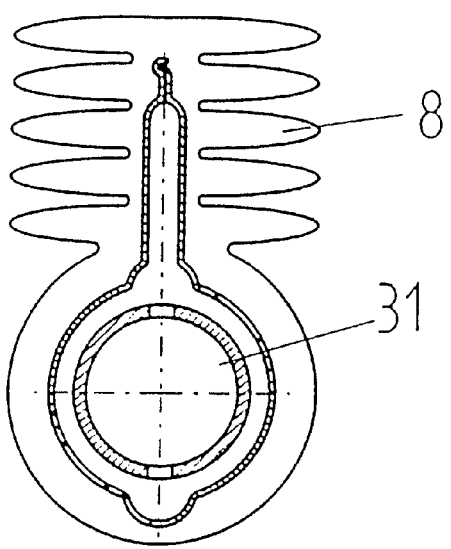
FIG. 12 shows a diffuser according to FIG. 10 with folded gas bag.
Figure 13:
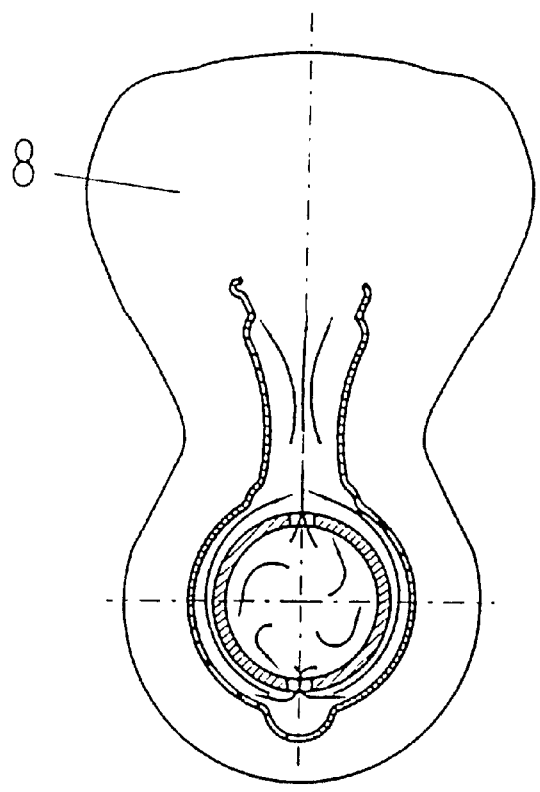
FIG. 13 shows a diffuser according to FIG. 11 with opening gas bag.
Figure 14:
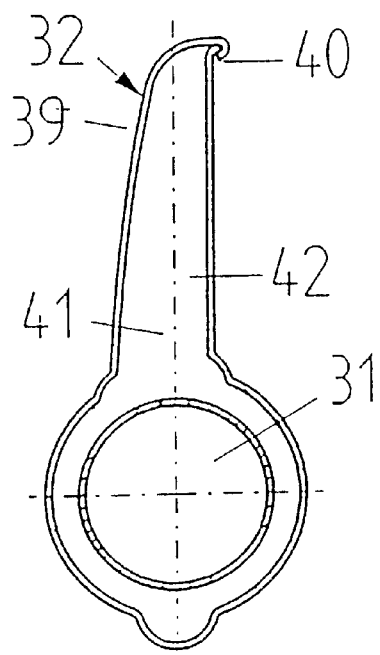
FIG. 14 shows a curved diffuser in the rest position.
Figure 15:
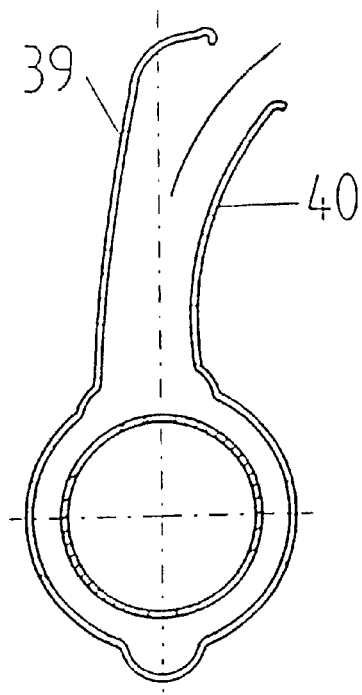
FIG. 15 shows the diffuser according to FIG. 14 after the action of the pressurized gas.

FIG. 12 shows by way of example the gas bag 8 folded in he area of the diffuser and FIG. 13 shows the opening gas bag A further alternative embodiment of a diffuser 32 is shown in FIG. 14. This has two side parts 39, 40 which are curved in the upper area. Furthermore the side parts have corrugations 41, 42 wherein the corrugation 41 is larger than the corrugation 42. The bending stiffness of the side part 39 is thereby larger than that of the side part 40. As shown in FIG. 15 the side part 39, and more particularly also its curvature, is scarcely deformed in the upper area under the influence of the pressurized gas while the side part 40 is deformed. This produces a flow direction inclined towards the right as is apparent from FIG. 15.

Figure 16:
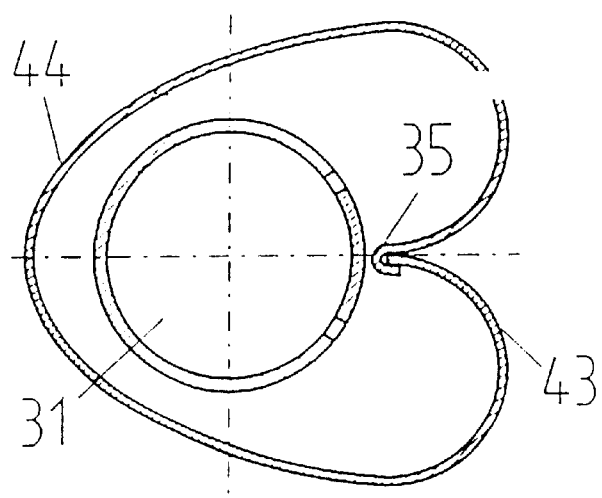
FIG. 16 is a cross-sectional view through a further embodiment of a flap diffuser.
Figure 17:
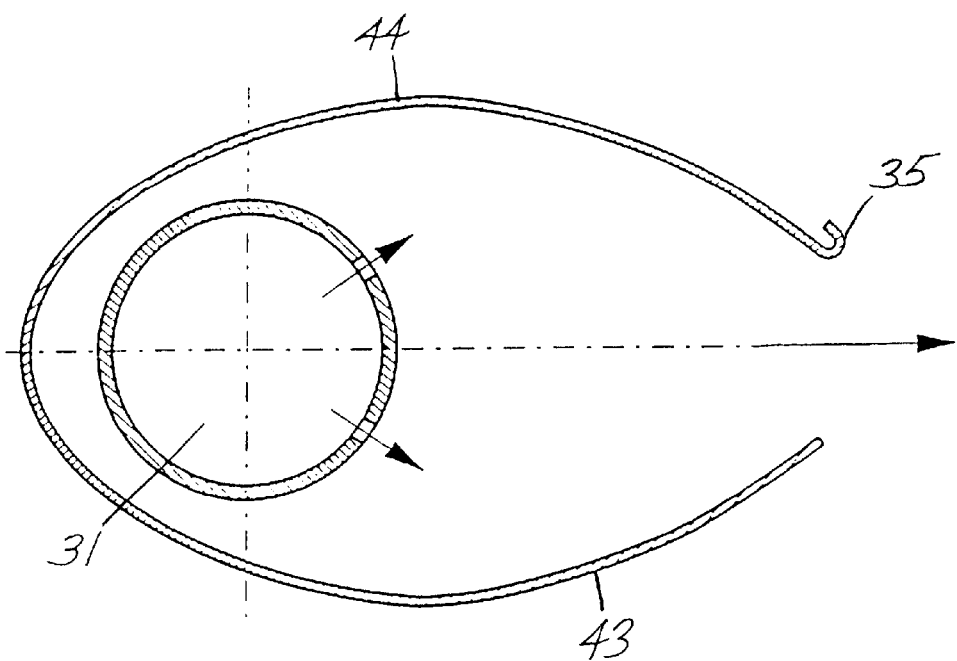
FIG. 17 shows the diffuser according to FIG. 16 after the action of the pressurized gas.

In the alternative embodiment of FIG. 16, the diffuser 32 has two side parts 43, 44 which are bent round at their ends in the direction of the gas generator 31 and are connected together by means of the lip 35 behind which the end of the side part 43 engages. This diffuser 32 projects in the rest position only to a slight extent into the gas bag (not shown). After the action of the pressurized gas the side parts 43, 44 are deformed in the direction of the gas bag as is shown in FIG. 17 so that the pressurized gas only flows into the gas bag at a certain distance from the gas generator 31.

The cross-sectional shape of the flap-like sections 5, 19, 20 is curved or angular (See FIGS. 1–7).

What is claimed is:

1. A device for influencing the flow of gas from an inflator into a bag of an airbag module, the device comprising:

at least one component part provided between the inflator and the bag and having at least one tab;

wherein a portion of the component part is deformable under the pressure of gas emerging from the inflator;

wherein each of the at least one tab prevents the deformable portion from separating from the remainder of the component part when the deformable portion is deformed by the pressure of the gas emerging from the inflator; and wherein the deformable portion is lifted away from the component part due to the pressure of gas emerging from the inflator and is prevented from projecting freely away from the component part by the at least one tab.

2. The device of claim 1, wherein the deformable portion includes a flap section that can swivel on at least one side.

3. The device of claim 2, wherein the flap section comprises opposite sides having a continuous and hinged connection with the component part and at least one slit and wherein two retaining tabs extend parallel to the opposite sides.

4. The device of claim 1, wherein the at least one tab comprises two tabs.

5. The device of claim 1, wherein each of the two tabs extends in a direction substantially parallel to opposite sides of the deformable portion.

6. The device of claim 1, wherein the deformable portion can swivel on at least one side.

7. The device of claim 1, wherein the deformable portion has a hinged connection with the component part.

8. The device of claim 1, wherein the tab has at least one of an L-, Z-, U- or T-shape.

9. The device of claim 1, wherein the component part further comprises a pressure compensating opening located in the deformable portion.

10. The device of claim 1, wherein the component part is part of a gas collecting tube which encloses the inflator.

11. The device of claim 1, wherein the deformable portion has a curved cross-sectional shape.

12. The device of claim 1, wherein the deformable portion is surrounded by a plurality of perforations in the component part.

13. The device of claim 12, wherein at least one of the perforations comprises a slit in the component part.

14. The device of claim 12, wherein at least two of the perforations comprise slits that extend along opposite sides of the at least one tab.

15. The device of claim 12, wherein the perforations are arranged along the component part so that the deformable portion is prevented from projecting freely away from the component part by the pressure of gas emerging from the inflator.

* * * * *